United States Patent [19]

Wohlford

[11] Patent Number: 4,522,452
[45] Date of Patent: Jun. 11, 1985

[54] ENDLESS TRACK EMBODYING TRACK SECTIONS INCLUDING FLEXORS

[75] Inventor: William P. Wohlford, Bettendorf, Iowa

[73] Assignee: Deere & Company, Moline, Ill.

[21] Appl. No.: 460,214

[22] Filed: Jan. 24, 1983

[51] Int. Cl.$^3$ .................. B62D 55/20; B62D 55/24
[52] U.S. Cl. ............................... 305/43; 305/35 R; 305/54
[58] Field of Search ............... 305/35 R, 35 EB, 36, 305/37, 38, 40, 43, 54, 57

[56] References Cited

U.S. PATENT DOCUMENTS

| | | | |
|---|---|---|---|
| 2,515,128 | 7/1950 | Lammertse | 305/38 |
| 3,346,306 | 10/1967 | Siber | 305/40 |
| 4,428,625 | 1/1904 | Wohlford | 305/35 R |

Primary Examiner—David A. Scherbel

[57] ABSTRACT

A track-laying tractor drive track is composed of a plurality of sections which each include a link and a grouser bolted together in sandwiching relationship to a pair of side-by-side disposed flexors, the bolts passing through holes provided adjacent the ends of the flexors. The flexors are generally flat rectangular members and the link and grouser have generally flat mounting surfaces which engage the opposite sides of the flexors adjacent their ends. A given flexor may be replaced by removing the bolts associated therewith and by then dislodging the flexor sideways from between the link and grouser. The neighboring flexor to the one removed keeps the track held together so that replacement may be accomplished without the need of tools to hold the track together.

3 Claims, 3 Drawing Figures

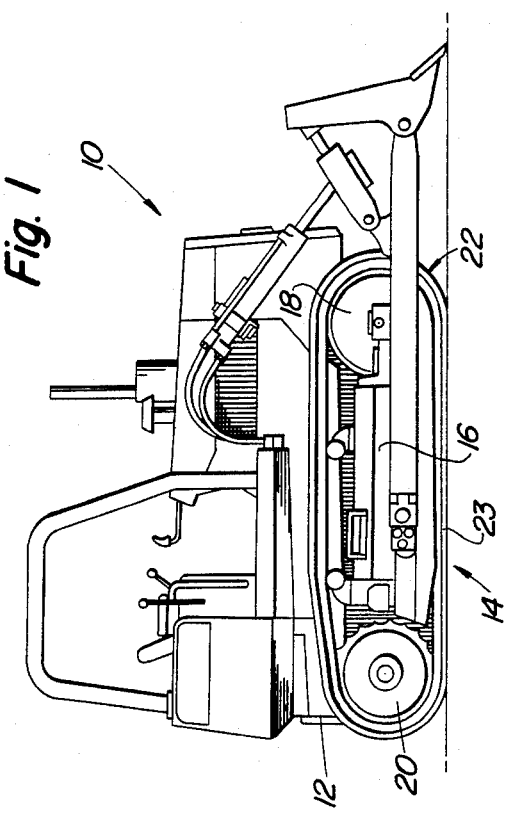
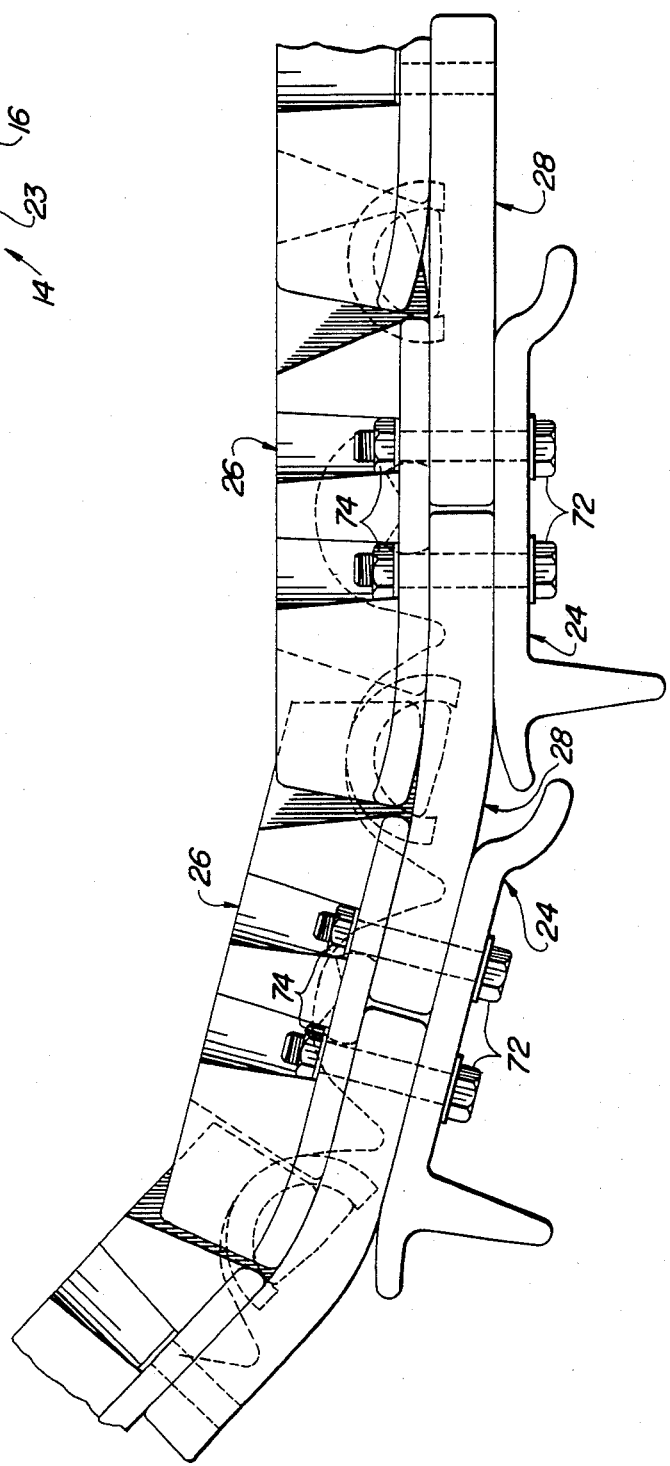

1

ENDLESS TRACK EMBODYING TRACK SECTIONS INCLUDING FLEXORS

RELATED APPLICATION

This invention is disclosed in applicant's applications Ser. No. 344,668 (now U.S. Pat. No. 4,428,625 granted Jan. 31, 1984); Ser. No. 344,669 (now U.S. Pat. No. 4,443,041 granted Apr. 17, 1984); Ser. Nos. 344,670 and 344,672 (now U.S. Pat. No. 4,451,097) filed on Feb. 1, 1982.

BACKGROUND OF THE INVENTION

The present invention relates to track-laying, vehicle drive tracks composed of interconnected track sections embodying flexors which interconnect and provide flexure between adjacent sections.

Conventional tracks for track-laying vehicles include a plurality of track sections comprising sets of right- and left-hand rail portions which are interconnected by pin and bushing assemblies that define pivot joints for permitting relative pivotal motion between adjacent track sections. During operation, these pin and bushing assemblies wear and eventually require turning or replacement. In either case, the track must be removed from the vehicle, and special equipment is required for pressing out the pins and bushings.

Designers have proposed track designs which avoid the use of pin and bushing connections between adjacent track sections by using flexors to interconnect and provide flexure between adjacent track sections. U.S. Pat. No. 1,774,815 issued on Sept. 2, 1930 is an example of such a track design. While replacement of the flexors in the patented design can be done without using special press equipment as is necessary with conventional track design, it is still necessary to remove the track from the vehicle or to at least "break" the track at the flexor desired to be replaced.

SUMMARY OF THE INVENTION

According to the present invention there is provided a track design embodying flexors in an arrangement which lends to improved serviceability.

It is an object of the invention to provide a track design embodying flexors in an arrangement permitting simple tools to be used in replacing the flexors without removing the track from the vehicle.

A more specific object of the invention is to provide a track design composed of a plurality of track sections which each include a pair of flat flexors located side-by-side and having first ends held between flat surfaces of link and grouser elements by bolts which pass through the flexor ends and the link and grouser elements. A given flexor of the pair of flexors can then be replaced while leaving the other flexor of the pair in place so that the track need not be "broken" nor removed from the vehicle.

These and other objects of the invention will become apparent from a reading of the ensuing description together with the appended drawing.

BRIEF DESCRIPTION OF THE DRAWING

FIG. 1 is a right side elevational view of a track-laying vehicle of the type with which the present invention is particularly adapted for use.

FIG. 2 is a right side elevational view showing a segment of the track meshed with the drive sprocket.

DESCRIPTION OF THE PREFERRED EMBODIMENT

Figure 3:
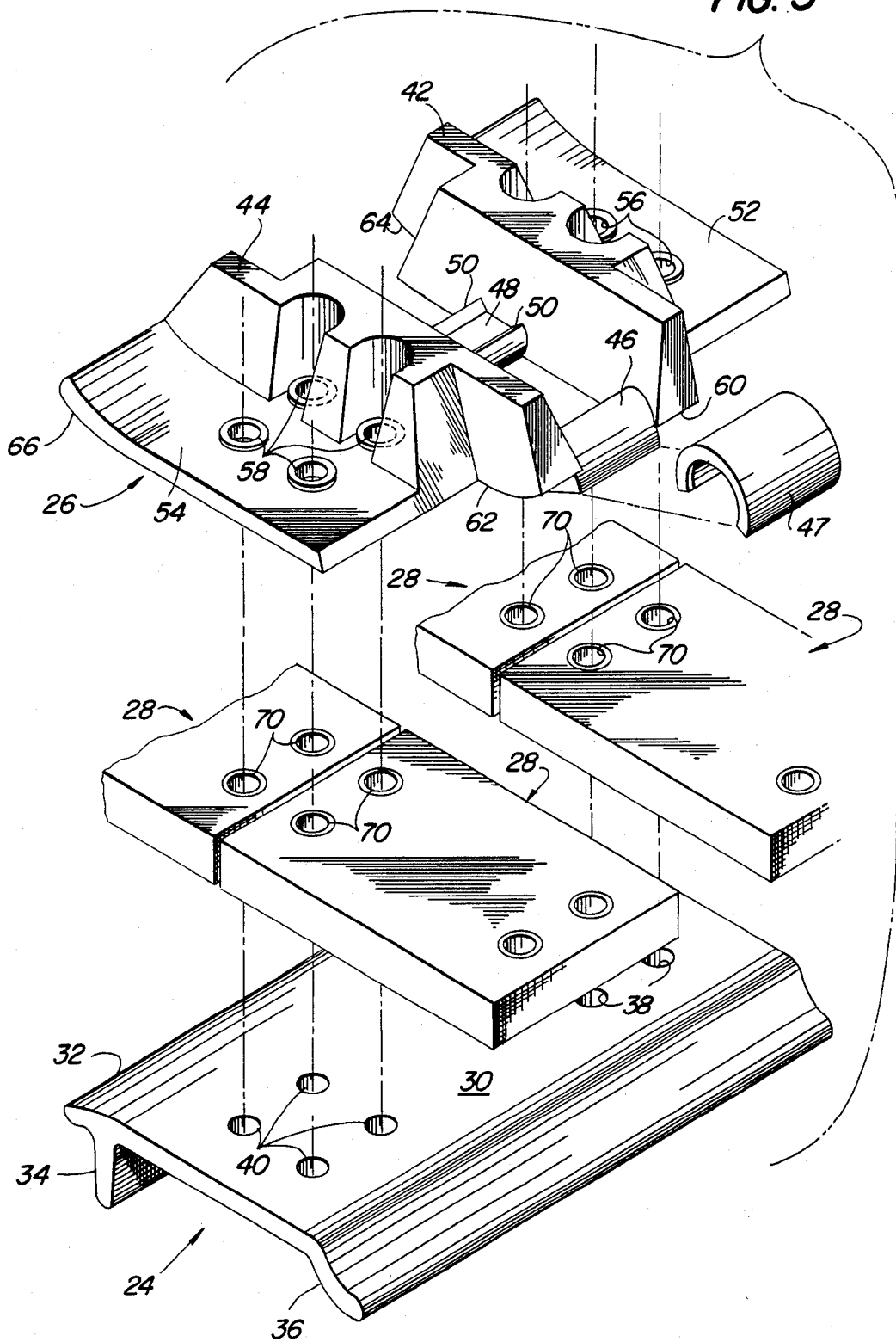
FIG. 3 is an exploded perspective view showing a track section, with fasteners absent, constructed in accordance with the present invention and showing end portions of a pair of flexors of an adjacent track section.

Referring now to FIG. 1, therein is shown a crawler tractor 10, which typifies the type of vehicle with which the present invention is particularly suited for use. The tractor 10 includes a main frame 12 supported on track assemblies 14 (only one shown) extending longitudinally at the opposite sides thereof. Each track assembly 14 includes a track frame 16 having an idler wheel 18 slidably supported on the forward end thereof. Supported from the frame 12 and disposed in fore-and-aft alignment with the wheel 18 is a drive sprocket 20. An endless drive track 22 is trained about the wheel 18 and sprocket 20 and has a lower run 23 engaged with the ground. It is here noted that the description of various components of the track contained hereinbelow is made as though the components were located in the lower run and viewed by a person facing in the direction of forward travel of the vehicle, as indicated by the arrow A.

Referring now to FIGS. 2 and 3, it can be seen that the drive track 22 comprises a plurality of identical grousers 24, track links 26 and flexors 28. Each grouser is bolted to a track link in sandwiching relationship to respective first end portions of a pair of flexors to form a track section. The grouser and track link of an adjacent track section are bolted together in sandwiching relationship to respective second end portions of the pair of flexors whereby the pair of flexors serve to interconnect and provide flexure between the adjacent track sections.

More specifically, each grouser 24 includes a central flat portion 30 located between a rear end portion defining an upwardly convex upper surface 32 and a transverse, depending cleat 34, and a downwardly- and forwardly-curved forward end portion 36. The forward end portion 36 of a first grouser is located beneath and in overlapping relationship to the rearward end portion of an adjacent grouser. Inner and outer sets of bolt holes 38 and 40, respectively, having four holes in each set, are provided in the flat portion 30 of the grouser in transversely spaced, side-by-side relationship to each other.

Each track link 26 includes transversely spaced, inner and outer rail portions 42 and 44, respectively, which have their forward ends joined by a sprocket-engaging portion comprising a base in the form of a generally semi-cylindrical, transverse bar 46 and a wear cap 47 received on the bar. The wear cap 47 is in the form of a cylindrical bushing segment which is slightly more than semi-cylindrical. The rail portions 42 and 44 are also joined together by a sprocket receptacle cleaner portion defined by a second bar 48 located about halfway between the front and rear ends of the rail portions. The second bar 48 is formed to define a pair of transverse ridges or teeth 50 for dislodging material from between the sprocket teeth. Formed integrally with the bottoms of the rail portions 42 and 44 are respective plate portions including respective inner and outer central flat portions 52 and 54. The inner flat portion 52 is provided with a set of four bolt holes 56 arranged in alignment with the set of holes 38 provided in the grouser 24. Similarly, the flat portion 54 is provided with a set of four bolt holes 58 arranged in alignment with the set of holes 40 provided in the grouser 24. The forward end portions of the flat portions 52 and 54 terminate short of respective forward end portions of the rail portions 42 and 44, which have under surfaces 60 and 62, respectively, that are arcuately curved upwardly. The under surface of the rear end portions of the rails 42 and 44 and the rear end portions of the plate portions of the link 26 are also arcuately curved upwardly, as at 64 and 66, the surfaces 60 through 66 serving to control the radius of flexure of the flexors 28.

The flexors 28 are flat rectangular members and are composed of a resilient load-carrying metal core (not shown) encased in a protective elastomer. The details of the core are omitted for the sake of brevity and for such details reference may be had to applicant's co-pending application Ser. No. 344,762 filed on Feb. 1, 1982. The opposite ends of each of the flexors 28 are provided with a pair of mounting holes which extend through the metal core and have bushings 70 received therein. Each track section comprises a pair of the flexors 28 disposed in spaced side-by-side relationship to each other and having one of their ends held between a first one of the grousers 24 and a first one of the track links 26 by bolts 72 received in appropriate ones of the sets of bolt holes 38 and 40 of the grouser, and 56 and 58 of the link, the bolts being held in place by nuts 74. The bushings 70 establish a metal-to-metal connection between the grouser and link and ensure that when the nuts 74 are properly torqued onto the bolts 72, they remain tight during operation. Also bolted into place between the first ones of the grouser and link are respectively ends of a pair of the flexors 28 of an adjacent track section.

Thus, it will be appreciated that a given flexor 28 may be replaced merely by using ordinary tools to remove the bolts 72 holding the opposite ends of the flexor in place and then to dislodge the flexor from between the associated grousers and links. The nuts on the remaining bolts may be loosened if necessary to provide clearance for freeing the flexor. The flat confronting surfaces of the associated grousers and links facilitate the removal of the flexor, however, there are many configurations that the flexor and associated links and grousers could take without departing from the invention. Specifically, any configuration which permits the flexor to be moved sideways from between the associated links and grousers without separating the links and grousers apart any appreciable amount, would be suitable.

With one flexor of a given track section removed, the track still remains held together by the other flexor of the track section. Thus, no special tools are required for holding the track together for permitting replacement of the removed flexor.

I claim:

1. In an endless track composed of a plurality of interconnected track sections which each include a pair of flexors arranged in side-by-side relationship to each other, a grouser, a link and a plurality of bolts extending through and holding the grouser and link together with first ends of the flexors positioned therebetween, the improvement comprising: said flexors being generally rectangular in plan view; said plurality of fasteners including some which pass through one and others which pass through the other of the pair of flexors; and the pair of flexors and the grouser and link all being configured such that upon removal of the screw fasteners associated with one of said pair of flexors, said one of the pair of flexors may be moved sideways from between the grouser and link while the other of the pair of flexors remains in place.

2. The endless track defined in claim 1 wherein the flexors are flat rectangular members and the grouser and link have flat mounting surfaces engaged with opposite sides of the flexor.

3. The endless track defined in claim 1 wherein each flexor includes a pair of mounting holes in its opposite ends and said plurality of bolts including a pair received in the holes at one end of the flexor.

* * * * *